June 5, 1945.  J. R. HOLICER  2,377,343
ROTARY GAUGE FOR LIQUEFIED PETROLEUM GAS TANKS
Filed Sept. 2, 1943    2 Sheets-Sheet 1
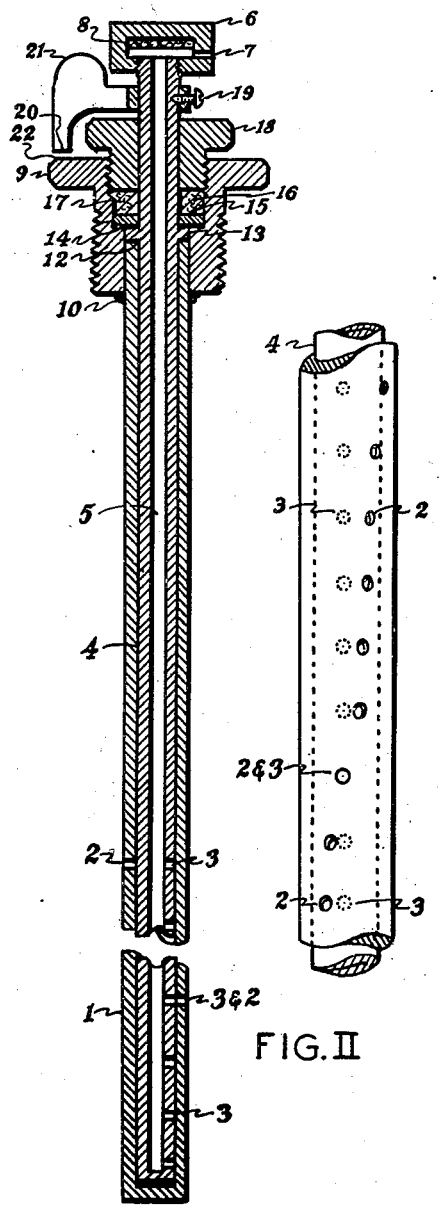
FIG. I    FIG. II    FIG. III    FIG. IV
John R. Holicer
INVENTOR.
BY June 5, 1945.                J. R. HOLICER                2,377,343
              ROTARY GAUGE FOR LIQUEFIED PETROLEUM GAS TANKS
                 Filed Sept. 2, 1943          2 Sheets-Sheet 2
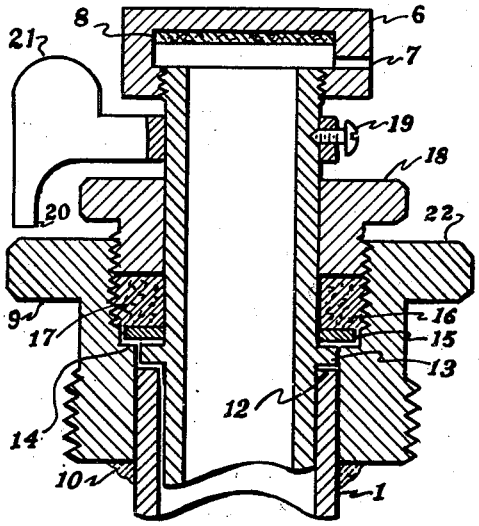
FIG. V
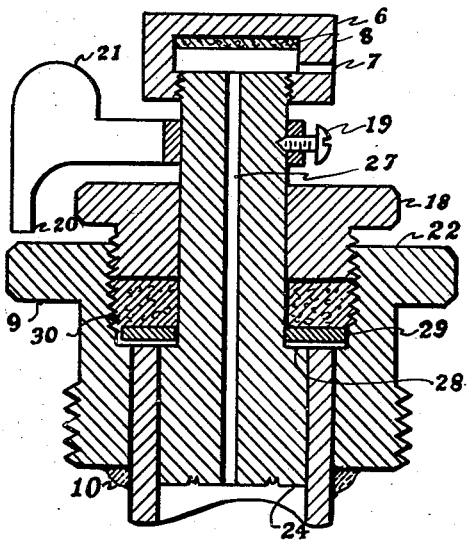
FIG. VII
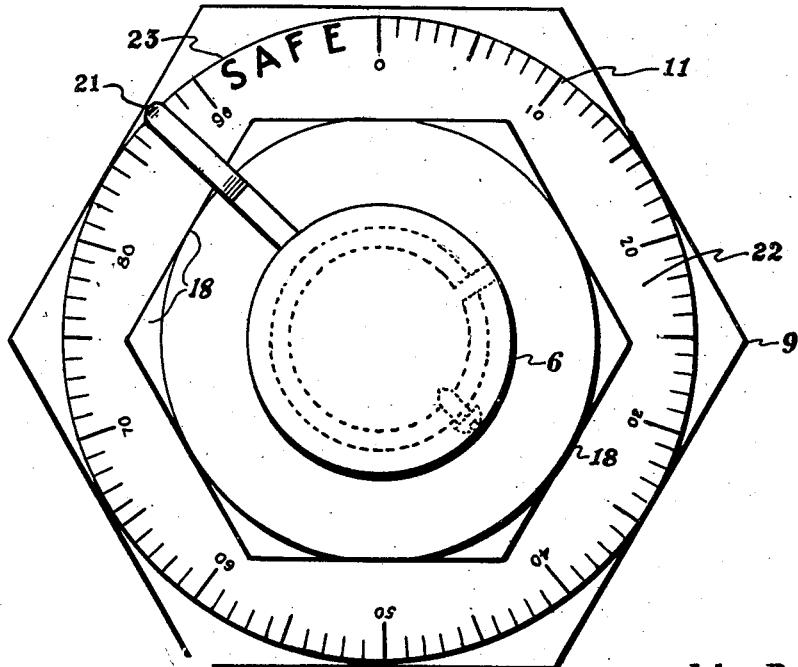
FIG. VI
John R. Holicer
INVENTOR.
BY Patented June 5, 1945

2,377,343

UNITED STATES PATENT OFFICE 2,377,343

ROTARY GAUGE FOR LIQUEFIED PETROLEUM GAS TANKS

John R. Holicer, Shreveport, La.

Application September 2, 1943, Serial No. 501,021

10 Claims. (Cl. 73—298)

This invention is concerned with apparatus for determining the level of liquid in a pressure vessel; and it is particularly well adapted to determine the level of liquid in a vessel containing liquefied petroleum gas, such as butane and similar fuels.

This liquid level indicator is exact and positive in its indications; and it affords these readings under conditions of absolute safety to persons and property.

This application is to be considered as a continuation in part of my co-pending application for patent under Serial No. 492,738, filed June 29, 1943.

The prior art in liquid level indicators affords examples of such devices which, by reason of their construction or operation, are unsafe for handling the highly inflammable liquefied petroleum gases; and their use has resulted in fires and explosions and other losses.

Nevertheless, the operation of various pressure vessels and containers of liquids of various kinds, including the fuels indicated above, require the periodical determination of the liquid level in the container, and some method and apparatus must be provided to satisfy this need.

There have been made devices which operate through the use of a float which moves a gear that causes the partial rotation of a vertical rod at the top of which a magnet disposed below a glass face occasions the movement of a metallic needle, the position of which above the face indicates the liquid level in the tank.

However, such apparatus is fragile and far from safe. The gears wear, the float may leak; and worse still, the glass may break and allow the needle to be damaged, and moisture will rust it. Foreign materials may then accumulate and stop the needle from working. The gauge body may break and cause the discharge into the open of the explosive contents of the tank. The greatest trouble perhaps is that this type of gauge is not dependable or accurate.

Other devices attempting to indicate the liquid level have been made which are spoken of as "slip tube" gauges. These amount to nothing more than an open, vertical tube slideably disposed through an opening in the top of the tank so that when the tube is lifted up, the liquid will cease to flow out of the top of the tube when its lowest end is elevated above the liquid level. At any time the top of this tube is broken off, gases and liquids escape, with attendant danger to the operator and surrounding property; and the long extension of the tube withdrawn above the tank allows it to be easily broken. Likewise, it is easily bent when extended, and thus rendered inoperative.

No device has appeared which represents the positive safety measures of the instant invention. It is also positive in its readings, durable in its construction and simple in its operation.

Among the objects of this invention is the provision of a gauge indicating exact and positive readings of the liquid level.

An object is to provide a gauge which requires no glass or transparent or breakable member.

Another object is to provide a gauge without gears, floats or magnets.

A further object is to provide a gauge no part of which is required to be extended outwardly from the tank to effect reading, and which is, therefore, less likely to break and impossible to bend or distort.

An important object of the invention is to provide a normal positioning of the parts of the gauge so as to provide a positive lock and seal against the emission of any gas or liquid whatsoever while the device is in the safety position.

Another object of the invention is to provide a measuring device of greatest safety and one which will not allow the discharge of any volatile and explosive fuels even though the top part of the gauge outside of the tank may be broken off accidentally.

A further object is to provide a gauge which will instantly and accurately indicate the liquid level with the extreme minimum of operation, and which is as simple as the turning of a knob on the lock of a safe or the dialing of a radio. The extreme simplicity of this operation is a positive virtue. The device can never be misread and it is always accurate.

A still further object is the provision of an outage gauge in one and the same instrument with the liquid leved gauge. Because of the volatile and expansive nature of liquefied petroleum gases, it is considered prudent and even necessary from the standpoint of safety to fill the storage tank with liquid less in volume than the maximum capacity of the tank. In other words, a gas layer is allowed to form above the liquid to act as a cushion against the further expansion of the liquid into gas, and thereby render the tank less subject to violent variations of internal pressure. This unfilled space is commonly called outage space; and some operators guess at the outage space remaining. Others read the uncertain dial of a magnetic gauge; and others in various ways approximate the outage space remaining.

In this device the outage space is exact and predetermined; and it is usually determined in advance at ten per cent of the tank capacity.

This device provides a short closed section of the tubes in the extreme upper part of the tank, through the walls of which tubes neither gas nor liquid may pass at any time; and the length of this closed section measures the outage space. New fuel flowing into the container from above and having no outlet or vent through the upper walls of the tubes, will cease to flow when cushioned against the back pressure of the gas formed in the outage space. This object of providing an outage gauge is important.

In the drawings:

Fig. I represents a sectionalized elevation of the complete gauge assembly, showing standard construction.

Fig. II shows an elevation of the perforated tubes which constitute a part of the liquid level gauge disclosed in Fig. I.

Fig. III shows an alternate construction employing a rod-like rotatable member of the gauge with simplified head.

Fig. IV shows an elevation of a part of the alternate rod-like rotatable member within its tubular casing, as employed in Fig. III.

Fig. V is an enlarged sectionalized elevation of the top part of the gauge shown in Fig. I.

Fig. VI is a plan view of the top part of the gauge; and this disclosure is the same in both forms of construction indicated by Figs. I and III.

Fig. VII is an enlarged sectionalized elevation of the top part of the gauge shown in Fig. III.

Various adaptations and modifications in structure can be made in this gauge without departing from the objects and intention of this invention; and these drawings are only offered as a suitable and preferred form of construction. However, they are not intended to disclose the only suitable construction. The vertical holes in the rotatable tube could be displaced with a vertical slot in the rotatable rod or tube, and the device will work perfectly. With these thoughts in mind, further reference is made to the drawings, as follows:

Numerals are employed to designate the parts of the structure; and numeral 1 indicates the outer tube of the gauge, through the walls of which there are provided spaced apertures 2. These apertures may take the form of holes, as shown in the drawings, or short slots; or they may be spaced openings of any shape which may be found suitable.

The apertures are disposed around and through the wall of the tube 1 in a spiral manner; and they are adapted to successively register with a series of holes 3 disposed in vertical fashion along the wall of the rotatable inner tube 4, so that when this member is rotated within the outer tube, the holes 3 may be brought successively into alignment with one after another of the holes 2, and thus provide communication with the tank or pressure vessel within which this gauge is depended; and such communication continues from the vessel through the wall of outer tube 1 and into channel 5 vertically disposed within the rotatable member 4.

This channel continues upwardly and is provided to discharge a very small quantity of the contents of the tank through the upper end of member 4, which is provided with a screw cap 6 having therein the indicator hole 7. The cap also carries a gasket 8 to effectively seal and close the channel in member 4 when the cap is screwed down, in which position indicator hole 7 may no longer communicate with channel 5.

The vertical spacing between the several apertures 2 corresponds in degree with the vertical spacing between apertures 3. It will be seen, then, that when member 4 is rotated within tube 1, the apertures in each, which are on a common level, will register. Thus, the contents of the tank, whether liquid or gas at the level of registration, will instantly begin to flow out of indicator hole 7 when cap 6 is partly lifted or unscrewed; and thus the character of the discharge may be instantly examined to determine whether it be gaseous or liquid.

The vertical distance between the successive horizontal levels of the apertures that may thus be brought into registration can be determined to suit any reasonable needs, and thus allow the examination of the contents of the tank at any number of levels which may suit the convenience of the operator.

For instance, the tank into which the gauge is to be introduced may be measured in advance; and a gauge suitable for revealing the liquid level at various stages may be provided for that particular tank.

Such measurements may be made in inches or fractions thereof; or the measurements may be taken and read in gallons; or, as is more usual, the reading can be determined in percentage of the total possible contents of the tank.

In the handling of liquefied petroleum gas, it is desirable to provide an "outage space" in the topmost part of the tank, which will not be filled with liquid fuel but in which gas will be allowed to accumulate. This outage space is usually determined at ten per cent of the maximum tank content. When it is so determined, the gauge is calibrated to read and reveal the presence of liquid at various levels, as desired, in the remaining and lower ninety per cent of the tank space.

No openings are provided in outer tube 1 above the ninety per cent level. The operator may set the gauge to show the flow of liquid at the ninety per cent level; and then he may proceed to fill the tank until the liquid appears through the indicator hole 7, whereupon he will cease from filling the tank, knowing that it then contains ninety per cent of liquid, and that ten per cent of the space is left for gas, which gas has a cushioning effect when pressure increases in the tank by reason of a rise in the temperature of its contents. This is a valuable safety feature; and it prevents undue stress upon the tank itself. It also prevents an over-filled tank resulting in increased pressure and the discharge of gas to the atmosphere through the safety valve in such volume as to cause a fire hazard.

Outer tube 1 is closed and sealed at its bottom end, so that there can be no communication through it to the tank except through apertures 2.

Fitted around the upper end of tube 1 is an adapter 9, so constructed as to allow it to be carried in a threaded opening in the top of the tank; and this adapter may be firmly fastened to the tube by means of welding 10, or by other suitable means. When so firmly fixed, it allows the permanent disposition of the adapter, so that indicator markings 11 on the upper horizontal face of the adapter continue to bear a fixed relation to each of the spirally disposed holes 2 arranged around and through the wall of the tube.

The top of tube 1 forms a shoulder 12 on which fixed ring 13 may rest. This fixed ring is firmly attached to and made to move with rotatable member 4.

A shoulder 14 is provided in the adapter, so that loose ring 15 may be disposed immediately above this shoulder and also immediately above fixed ring 13 at the bottom of a space 16 provided between the wall of the adapter and the wall of rotatable member 4. This space is filled with packing 17. This packing is compressed and held in leak-proof position by packing nut 18.

Such construction allows member 4 to be rotated within tube 1 without any possibility of a leak of the contents of the tank; and it also allows loose ring 15 to be kept in its proper place so that member 4 can not be forced upward in the tube by pressure within the tank. Fixed ring 13 will prevent this upward movement. Yet this construction is such that rotatable member 4 may be removed simply by unscrewing packing nut 18 and removing the packing and the loose ring. This allows quick and easy inspection and cleaning and repair, whenever necessary.

Near the upper end of rotatable member 4 there is removably attached the indicator 20, which is provided to carry a handle 21; and this indicator may be kept in fixed position by the set screw 19.

As stated above, indicator markings 11 are placed upon the upper horizontal face of the adapter to provide an indicator face; and this face is shown by numeral 22. Regardless of the character of the markings placed thereon, this face is provided to show a space 23 marked with the word "safe."

Since there are no openings in the upper ten per cent of tube 1, the part of the face marked "safe" is best dispositioned to correspond with that measurement on the tube. In any event, when the indicator is turned to the safety position, there can be no discharge of the contents of the tank, whether gas or liquid, because there then exists no opening into the tank through the gauge.

It then comes about that even if cap 6 were removed and thrown away, and even if all of the parts of the gauge above the indicator face were broken off, there would be no leak and no discharge of inflammable fluids. This is a safety feature of much importance.

There are numerous minor safety areas in which the indicator hand may be placed and which provide the same safety features as found in the area marked "safe." These minor safety areas are between the calibrations on the indicator face which correspond with the openings in tube 1. While rotatable member 4 is being turned between the points at which registration of the holes is complete, these minor safety areas are in use.

It is not necessary that rotatable member 4 be formed of a tube, as shown in Figs. I and II and in Fig. V. However, a tube will work admirably. It is desirable, however, when a tube is used that the vertical opening 5 therethrough be relatively small, as very little of the contents of the tank need be discharged at any time to determine its character. In fact, a relatively tiny channel 5 not only fully satisfies the needs for an outlet in this gauge, but its very small size presents a safety feature. Very little of the contents of the tank can thus escape while inspection is being made.

Furthermore, it is not necessary that apertures 3 in the rotatable tubular member 4 be made as a vertical row of holes. A slot through the tube wall may be employed in their stead.

In order to make the alternate construction more clear, Figs. III, IV and VII are here provided, in which rotatable member 4 is formed of a solid piece of material such as a rod 24, down one wall of which is provided a slot 25. This slot is narrow and small. It is best made only wide enough to form a small aperture which will register with the proper opening 2 in outer tube 1, to which it may be turned while member 24 is being rotated or partly rotated. The same result follows as when tubular member 4 is provided carrying holes. A minute quantity of the contents of the tank will pass through one of the holes 2 and into the slot or channel 25 and thence upwardly to cap 6, from which it escapes through hole 7.

When rotatable member 24 is a made of solid material carrying slot 25, this slot need continue no further up than the uppermost hole in tube 1, or slightly thereabove. At or near its termination, this slot can be made to communicate with cross-channel 26 going further into the rod; and this cross-channel is made to communicate with vertical channel 27 which leads into cap 6.

This alternate construction allows for some modification in the head of the gauge, as shown in Fig. VII. The rod 24 may be cut down and made smaller at its upper end, so as to provide shoulder 28; and this shoulder should be in the same horizontal plane with the extremity of tube 1, thus allowing free ring 29 to rest on this shoulder and be held in place by packing 30. Packing nut 18 can be used in either construction; and the remaining parts of the gauge in the alternate construction are duplicates of those first hereinabove disclosed.

When alternate construction is employed, as in Fig. III, the head of the gauge is made more simple, as in Fig. VII.

In the operation of this gauge, it is to be remembered that it is both a liquid level indicator and an outage gauge.

Its function as an outage gauge is automatic. No perforations are provided through the walls of the upper part of the fixed tube or casing carried immediately within the top of the tank. There are no such openings above the ninety per cent level in the tank.

Normally, the gauge is partially rotated while the storage tank is being filled with liquefied petroleum gas, so that the gradually ascending level of the liquid may be noted from time to time. During this process of rotation, or partial rotation, there is effected successive registrations of companion perforations in the outer tube and the rotatable member which it encases. This allows gas or liquid to escape, depending on the level at which the immediate registration is effected. The gauge may be set so that the two highest perforations in these members are in line; and in this position, gas only will continue to escape until liquid appears at this level and flows out of the indicator hole in the extreme top of the gauge. Then the gauge is turned to closed or safety position. Thereafter, since neither liquid nor gas may further flow outward through the gauge, and thereby lessen the pressure within the tank, pressure builds up within the tank to resist the incoming charge of new fuel being delivered. This arrangement, therefore, provides a cushioning stratum of gas in the topmost part of the tank, and lying over the liquid itself. Thus the outage area is filled with gas under pressure.

If the storage tank is being filled by gravity, then the back pressure of the gas in the outage area simply resists the incoming liquid, and a final level of the liquid in the storage tank is automatically achieved, leaving an outage space.

On the other hand, if the tank is being filled by pressure, then a pressure gauge on the incoming liquid supply line will indicate the moment that a resistance back-pressure is being built up in the tank; and then the operator will cut off the pump and cease to supply liquid fuel against this pressure. Again an outage space is thus left filled with gas.

The usual way of leaving the ten per cent outage space unfilled, however, is for the fuel delivery man simply to set the gauge for highest registration and watch the indicator hole at the top of the gauge until liquid appears. He then immediately ceases to fill the tank; and he closes the gauge.

Now, after the storage tank is filled to its normal charge of liquefied fuel, the line through which it is so filled is closed by the operation of the filler valve, and the line is capped. Then for a period of perhaps many days or a few weeks, no further supply of fuel is placed in the storage tank. But occasionally during this period the householder or the gas service man will make periodical inspections of the tank to determine the quantity of fuel which remains available for use. It is during this period that the liquid level gauge has its further usefulness, because it is desirable to have a new supply of fuel delivered before the old is entirely exhausted. This is done so that the customer may continue to have gas service without interruption.

At any time, therefore, an operator may go to the gauge and turn it off of its normal closed or safety position and determine the liquid level within the tank. This reading is always dependable; and it is accomplished in the following manner:

The rotatable member, having a series of vertically disposed perforations in spaced relation along its side wall, (or having a vertical slot therealong) can be caused to communicate with the contents of the tank only when it is rotated within the outer tube to the point where one of the spirally disposed and spaced holes in the outer tube registers with its companion opening in the rotatable member.

As a matter of convenience in reading, the vertical distance between the openings that register may represent a fixed measure of the liquid content of the tank; and it is usual to provide that each such measured space be five per cent of such content.

Therefore, when the two lowest holes register, the indicator over the dial face will stand at five per cent, showing that five per cent of the liquid fuel originally placed in the tank is still available for use.

When the reading is thus taken, the cap on the extreme top end of the rotatable member is slightly elevated by partly unscrewing it, thus exposing the indicator hole. This hole will discharge either gas or liquid, depending on whether the companion openings registering within the tank communicate with the liquid itself or the gas above the liquid.

The second level for measuring the liquid is indicated on the dial at ten per cent; and when the dial pointer is thus positioned, a reading can be taken in the manner hereinabove indicated.

Each pre-determined point for measuring the level of the liquid in the tank has a corresponding indicator figure on the dial face. These indications may be there shown in percentages, in fractions, in gallons, or in arbitrary symbols; and they may be as numerous or as few as the practice and requirement of the particular use to which this gauge is put may dictate.

There are two safety closures on this gauge. One of them is the topmost cap. When it is screwed down so that its cushioning gasket firmly engages the extreme upper end of the rotatable member, then neither gas nor liquid may be discharged through the gauge to the atmosphere. This cap is always firmly screwed down in place except when readings are being taken on the gauge.

A second and even more positive safety closure is provided by turning the rotatable member to a place where there can be no possible registration between perforations. This is a safety area. The maximum safety area is indicated on the dial face itself. The operator, therefore, cannot mistake the position of safety. When not in use, this gauge is left in safe position; and at such times there is no communication whatever between the rotatable member and the tank.

It is important to observe that even though the top of the gauge be broken off and the top of the rotatable member be broken off, or the cap thereabove be removed and thrown away, or the dial pointer and all of the mechanism to which it is attached above the tank be broken off, nevertheless, there will be no escape to the atmosphere of any of the contents of the tank whatsoever. The rotatable member and its fixed casing remaining in safe and sealed position will not allow such escape. Therefore, this is an extremely safe and fool-proof gauge.

This rotatable gauge presents valuable improvements and advances over the old style "slip tube" gauge and over the magnetic gauge with its float and delicate mechanism.

This gauge positively provides and automatically measures the desired and unfilled "outage space" at the top of the storage tank.

This gauge is extremely safe and dependable; and it eliminates the explosion hazard ordinarily present when exposed parts of old type gauges are broken off. Safety is one of its most important advantages.

I claim:

1. In a gauge for determining the contents of a vessel under pressure of liquefied petroleum gas, a fixed tubular member having spaced perforations therein; a rotatable member encased by the tubular member, and provided with a conduit adapted to be opened and closed to the vessel by rotation, and having a port leading from the conduit to the atmosphere at the top of the gauge; and means arranged to open and close the port.

2. In a gauge for indicating the contents of a vessel under pressure of liquefied petroleum gas, a rotatable member carrying a conduit adapted to communicate with the atmosphere near the top of the gauge and with the vessel when rotated; and a fixed casing for such member closed at its lower end and provided with apertures spirally disposed through the walls thereof and spaced to communicate with the conduit successively at different levels said apertures being so arranged that they do not completely encircle the casing, and both the rotatable member and the casing being arranged to be mounted in the top of the vessel and to extend therein to a point near its bottom and to be operated to allow the escape of a small quantity of fluid upwardly from the vessel by reason of pressure therein whenever the conduit is opened to the atmosphere and in communication with any aperture.

3. In a gauge for measuring the relative amounts of gas and liquid in a vessel under pressure of liquefied petroleum gas, a tubular member having spaced apertures therein below the level pre-determined for liquid and having a closed wall above such level; and a rotatable member closed at its lower end and provided with a conduit to the atmosphere from the top of the member, and encased in the tubular member, and adapted to effect communication between the conduit and the apertures successively when rotated, the gauge being arranged to be inserted through the top of the vessel to allow observation of the character of fluid allowed to escape upwardly from the vessel by reason of pressure within the vessel when said communication is effected.

4. In a gauge for determining the gas-filled outage space of a vessel containing liquefied petroleum gas under pressure, a fixed tube depending into such vessel and provided with a closed wall for the distance of the depth of such space and having spaced perforations therebelow; a rotatable member carried by the tube and provided with a conduit leading to the top thereof, such conduit being adapted to successively communicate with the perforations when the member is turned and allow the upward escape through the conduit of fluid under pressure within the vessel; a removable cap on the upper end of said rotatable member provided with an aperture arranged to be opened to the atmosphere when the cap is partially removed; and sealing means arranged to prevent the escape of fluid from the tank around the outside of the tube.

5. In a gauge for determining the contents of a pressure vessel at different levels therein, a pair of tubes, one encasing the other and the outermost sealed at its lower end; apertures in the tube walls at spaced intervals adapted to register with each other when one of the tubes is rotated and arranged to allow the upward escape of fluid from the vessel whenever said apertures are in registration; and a movable cap surmounting the rotated tube and arranged to control the escape of fluid.

6. In a gauge for measuring the contents of liquefied petroleum gas tanks under pressure, a tubular member adapted to be inserted in the top of a tank and provided with apertures spirally disposed about the wall thereof; a rotatable member encased by the tubular member and provided with a vertically disposed conduit adapted to communicate with the apertures successively when the inner member is rotated, the rotatable member being provided with an escape port at its top arranged to allow the discharge therethrough of fluid expelled by pressure within the tank when the conduit communicates with any of the apertures; indicator means adapted to be turned with the rotatable member and to indicate its position with reference to the spiral apertures; and a cap constructed to open and close the escape port.

7. In a gauge for measuring the contents of liquefied petroleum gas tanks operated under pressure of the gas therein, a tubular member adapted to be inserted in the top of the tank and provided with apertures spirally disposed about the wall thereof; a rotatable member encased by the tubular member and provided with a vertically disposed conduit adapted to communicate with the apertures successively when the inner member is rotated; indicator means provided with a handle and adapted to be turned with the rotatable member and to indicate its position with reference to the spiral apertures; and a movable cap provided with a restricted aperture and arranged at the top of the conduit for closing and opening the conduit.

8. In a gauge for measuring the contents of liquefied petroleum gas tanks under pressure, a tubular member adapted to be inserted in the top of the tank and provided with apertures spirally disposed about the lower wall thereof; a rotatable member encased by the tubular member and provided with a vertically disposed conduit adapted to communicate with the apertures successively when the inner member is rotated and arranged to discharge fluid upwardly through the conduit and out of the top thereof to the atmosphere so that the character of the discharge may be determined by inspection; means arranged to restrict such discharge and operable to close the conduit entirely; and indicator means adapted to be turned with the rotatable member and to indicate its position with reference to the spiral apertures in the tubular member and with reference to a measured space along the upper side wall of the tubular member, which space is free from apertures and arranged to traverse only the outage space in the upper part of the tank containing gas when the tank is supplied with its maximum charge of liquid.

9. In a gauge for measuring the contents of liquefied petroleum gas tanks under pressure, a tubular member adapted to be inserted in the top of the tank and provided with apertures spirally disposed about the wall thereof; a rotatable member encased by the tubular member, and provided with a vertically disposed conduit adapted to communicate with the apertures successively when the inner member is rotated and so arranged that a sample of the contents of the tank at the level of the communication between aperture and conduit will be expelled from the top of the conduit, said rotatable member being provided with a shoulder; a loose ring adapted to rest upon the shoulder; a nut removably carried around the rotatable member and adapted to normally maintain the loose ring in place; and a body member encasing the ring and arranged for the removable connection of the nut therewith, to prevent the rotatable member from being expelled by the pressure in the tank, the body member being constructed for attachment to the tank.

10. In a gauge for measuring the fluid contents of a tank under pressure of petroleum gas, a rotatable tube having vertically disposed apertures in its wall and permanently closed at one end; means for opening and closing the other end of the tube to control the discharge of fluid to the atmosphere; a casing disposed about the tube and provided with spirally arranged apertures through its walls, which apertures do not completely encircle the casing, said apertures being so positioned as to successively communicate with the vertical apertures when the tube is partially rotated.

JOHN R. HOLICER.